(12) United States Patent
Lv et al.

(10) Patent No.: US 11,392,314 B2
(45) Date of Patent: Jul. 19, 2022

(54) SEQUENTIALLY WRITING METADATA INTO A SOLID STATE DISK BY REDIRECT-ON-WRITE

(71) Applicant: EMC IP Holding Company LLC, Hopkinton, MA (US)

(72) Inventors: Shuo Lv, Beijing (CN); Ming Zhang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 44 days.

(21) Appl. No.: 17/027,111

(22) Filed: Sep. 21, 2020

(65) Prior Publication Data

US 2021/0303196 A1  Sep. 30, 2021

(30) Foreign Application Priority Data

Mar. 25, 2020  (CN) .......................... 202010220478.0

(51) Int. Cl.
*G06F 3/06* (2006.01)
*G06F 16/172* (2019.01)
*G06F 16/22* (2019.01)
*G06F 12/0802* (2016.01)

(52) U.S. Cl.
CPC .......... *G06F 3/0655* (2013.01); *G06F 3/0604* (2013.01); *G06F 3/0679* (2013.01); *G06F 12/0802* (2013.01); *G06F 16/172* (2019.01); *G06F 16/2246* (2019.01); *G06F 2212/72* (2013.01)

(58) Field of Classification Search
CPC .............. G06F 12/0802; G06F 16/172; G06F 16/2246; G06F 2212/72; G06F 3/0604; G06F 3/0655; G06F 3/0679
See application file for complete search history.

(56) References Cited

U.S. PATENT DOCUMENTS

| | | |
|---|---|---|
| 9,235,535 B1 | 1/2016 | Shim et al. |
| 9,665,306 B1 | 5/2017 | Patwardhan |
| 9,830,105 B1 | 11/2017 | Tummala et al. |
| 9,830,228 B1 | 11/2017 | Chopra et al. |
| 9,971,655 B1 | 5/2018 | Li et al. |
| 10,146,637 B1 | 12/2018 | Chopra et al. |
| 10,176,183 B1 | 1/2019 | Shim et al. |
| 10,289,494 B1 | 5/2019 | Chopra et al. |
| 10,585,752 B1 | 3/2020 | Chopra et al. |
| 10,860,427 B1 | 12/2020 | Chakraborty et al. |
| 10,976,954 B2 | 4/2021 | Wang et al. |
| 11,086,524 B1 * | 8/2021 | Sun ..................... G06F 12/0804 |
| 11,151,090 B2 | 10/2021 | Chamarthy et al. |
| 11,157,313 B2 | 10/2021 | Liu et al. |

(Continued)

*Primary Examiner* — Jane Wei
(74) *Attorney, Agent, or Firm* — BainwoodHuang (57) ABSTRACT

Techniques involve receiving a write request for writing metadata of a file system into a solid state disk having a multi-level cell, and then caching the to-be-written metadata into a memory. The techniques further involve sequentially writing the cached metadata into the solid state disk by redirect-on-write. Accordingly, there is a file system implemented for properties of a solid state disk having a multi-level cell. Such techniques are able to provide completely sequential write of metadata of the file system by supporting redirect-on-write, thereby reducing the write amplification of the solid state disk and improving the performance of the file system.

20 Claims, 6 Drawing Sheets

(56) References Cited

U.S. PATENT DOCUMENTS

| | | |
|---|---|---|
| 11,269,776 B2 | 3/2022 | Chen et al. |
| 2014/0281131 A1* | 9/2014 | Joshi .................. G06F 12/0868 |
| | | 711/103 |
| 2018/0357165 A1* | 12/2018 | Helmick ............. G06F 12/0246 |
| 2020/0183886 A1* | 6/2020 | Wang .................. G06F 12/0875 |
| 2020/0233751 A1* | 7/2020 | Gupta ................. G06F 11/1451 |
| 2020/0293447 A1* | 9/2020 | Gupta ................. G06F 12/0804 |

* cited by examiner

SEQUENTIALLY WRITING METADATA INTO A SOLID STATE DISK BY REDIRECT-ON-WRITE

CROSS-REFERENCE TO RELATED APPLICATION

This application claims priority to Chinese Patent Application No. CN202010220478.0, on file at the China National Intellectual Property Administration (CNIPA), having a filing date of Mar. 25, 2020 and having "METHOD, DEVICE AND COMPUTER PROGRAM PRODUCT FOR STORAGE" as a title, the contents and teachings of which are herein incorporated by reference in their entirety.

TECHNICAL FIELD

Embodiments of the present disclosure generally relate to the field of computers, and more specifically to a method, a device, and a computer program product for storage.

BACKGROUND

Hard disk is a storage medium that stores information on a computer. Hard disk includes hard disk drive (HDD) and solid state drive (SSD, referred to as "solid state disk"), where the hard disk drive belongs to disk storage devices, while the solid state disk is a semiconductor storage device. A solid state disk is usually made of an array of solid-state electronic memory chips, and includes a control unit, a storage unit, and the like.

In general, a solid state disk has much lower access delay than a hard disk drive does. A solid state disk is a pure electronic device without mechanical components, and therefore can provide low access delay, low power consumption, low noise, and impact resistance. However, a solid state disk has a limited life and has relatively poor random write performance. In addition, the smallest write unit in a solid state disk is one page. It is necessary to erase a data block before writing new data into a solid state disk, while doing write operations on an erased block limits a write cycle of the erased block.

SUMMARY OF THE INVENTION

Embodiments of the present disclosure provide a method, a device, and a computer program product for storage.

In one aspect of the present disclosure, a method for storage is provided. The method includes receiving a write request for writing metadata of a file system into a solid state disk, and then caching the to-be-written metadata into a memory. The method further includes sequentially writing the cached metadata into the solid state disk by redirect-on-write.

In another aspect of the present disclosure, an electronic device is provided. The device includes a processing unit and a memory, where the memory is coupled to the processing unit and stores instructions. The instructions, when executed by the processing unit, cause a write request for writing metadata of a file system into a solid state disk to be received, and cache the to-be-written metadata into a memory. The action further includes sequentially writing the cached metadata into the solid state disk by redirect-on-write.

In still another aspect of the present disclosure, a computer program product is provided. The computer program product is tangibly stored in a non-transitory computer-readable medium and includes computer-executable instructions. The computer-executable instructions, when executed, cause a computer to execute the method or process according to the embodiments of the present disclosure.

The summary is provided to introduce the selection of concepts in a simplified form, which will be further described in the Detailed Description below. The summary is neither intended to identify key features or essential features of the present disclosure, nor intended to limit the scope of the embodiments of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same elements.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. While some specific embodiments of the present disclosure are shown in the accompanying drawings, it should be understood that the present disclosure may be implemented in various forms, and should not be limited to the embodiments set forth herein. Rather, these embodiments are provided such that the present disclosure is more thorough and complete, and the scope of the present disclosure may be fully conveyed to those skilled in the art.

The term "include" and variants thereof used herein indicate open-ended inclusion, i.e., "including, but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects, unless otherwise specifically indicated.

A quad-level cell (QLC) solid state disk increases the density of a flash memory module by adding additional data bits to each memory cell, thereby reducing the costs of storage resources, such that the price of a solid state disk is getting closer to that of a hard disk drive. However, increasing the number of bits per unit will increase the number of times a charge is used to change the bit status, and will eventually shorten the life cycle of a solid state disk. In addition, a conventional file system does not have a file system for a solid state disk, especially a high-density solid state disk, and metadata in a conventional file system is usually written into a solid state disk randomly. However, random write will cause fragmentation inside the solid state disk and result in frequent expensive erase operations. Therefore, besides performance decline and delay increase, the life of the solid state disk may also be greatly reduced due to random write.

Thus, it can be seen that the conventional file system randomly writes the metadata to the solid state disk. Random write causes excessive write amplification, and seriously affects the performance and life of the high-density solid state disk with a limited number of erased words. Therefore, when the file system needs to support a new QLC solid state disk, how to reduce random write and reduce write amplification while ensuring the system performance and delay is a problem that needs to be solved urgently.

Therefore, embodiments of the present disclosure present a method for a file system implemented for properties of a solid state disk having a multi-level cell, and present a disk extent-based redirect-on-write file system for a solid state disk in a primary storage system. The embodiments of the present disclosure implement completely sequential write of metadata by supporting redirect-on-write, and write all metadata into a new location of a solid state disk, thereby reducing write amplification of the solid state disk and improving the performance of the file system.

In view of the short life cycle of QLC, the inventor of the present application presents a new method for a file system implemented for, e.g., a QLC solid state disk. The file system presented in the present application is a key-value file system, and basically all metadata is stored as key-value pairs. For example, a disk extent is a type of key, whose value is a list of pointers pointing to actual data; while an inode is indexed by an inode number, and its value is an inode structure. The redirect-on-write method of the embodiments of the present disclosure converts all IO write requests into sequential write of all data and metadata. Metadata changes are first delayed and cached in a memory, and then cascaded to the solid state disk step-by-step by merging and sorting.

Further, according to some embodiments of the present disclosure, a cost-effective index structure solves a recursive update problem of update propagation triggered by a series of writes, thereby avoiding additional metadata overhead caused by the update. In some embodiments, a combination of sorted B+ trees and journals can ensure the update sequence and performance, where the journaling process is not used for maintaining consistency, but for improving the performance. In addition, an auxiliary search tree greatly improves the performance of the file system. In a random search with a large B+ tree, the auxiliary search tree improves the search speed.

The basic principles and some example implementations of the present disclosure are illustrated below with reference to FIG. 1 to FIG. 8. It should be understood that these example embodiments are provided merely to enable those skilled in the art to better understand and then implement the embodiments of the present disclosure, and are not intended to limit the scope of the present disclosure in any way.

Figure 1:
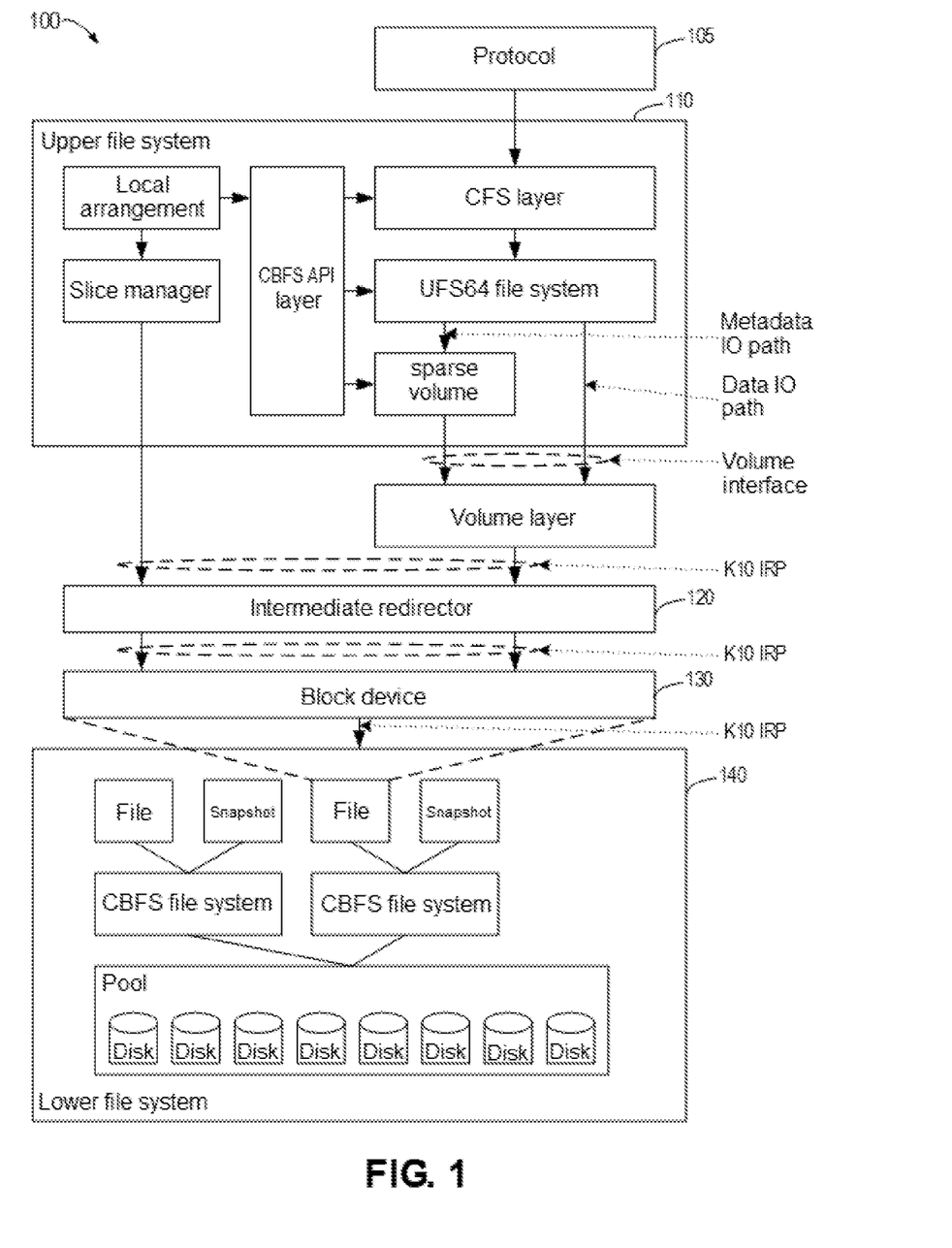
FIG. 1 shows a diagram of an example architecture of a file system.

FIG. 1 shows a diagram of an example architecture of UFS64 file system 100. As shown in FIG. 1, file system 100 relates to protocol 105, upper file system 110, intermediate redirector 120, block device 130, and lower file system 140. File system 100 is an example file system with enhanced scalability, good flexibility and availability, high storage efficiency, and high performance. File system 100 may be improved to implement a disk extent-based redirect-on-write file system for a solid state disk according to the present disclosure.

Figure 2:
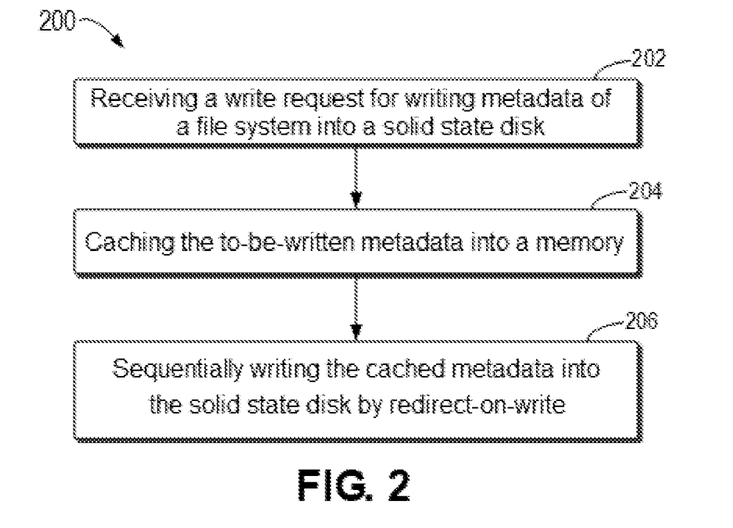
FIG. 2 shows a flowchart of a method for storage according to an embodiment of the present disclosure.

FIG. 2 shows a flowchart of a method for storage according to an embodiment of the present disclosure. Method 200 may be implemented, e.g., by a file system.

In 202: a write request for writing metadata of a file system into a solid state disk is received. For example, after sending an IO request for writing data into the solid state disk, an external host correspondingly obtains the write request for the metadata.

In 204: the to-be-written metadata is cached into a memory. For example, to-be-written data is first delayed in being written into the solid state disk and is cached in the memory, and then is written into the solid state disk after satisfying a predetermined condition, thereby avoiding fragmented writing.

In 206: the cached metadata is sequentially written into the solid state disk by redirect-on-write. For example, the metadata is sequentially written into a new location in the solid state disk in a size of 2M, thereby reducing the erase operations on the solid state disk and improving the system performance.

Therefore, method 200 according to the embodiment of the present disclosure implements completely sequential write of metadata by supporting redirect-on-write, thereby reducing the write amplification of the solid state disk and improving the performance of the file system. Accordingly, the embodiment of the present disclosure implements matching organization and management modes of the file system for properties of the solid state disk.

In addition, core abstraction of the file system of the embodiment of the present disclosure is key-value storage, and keys indexed thereby are large fixed-sized bit strings or integers with opaque variable-sized values. In addition, the file system of the embodiment of the present disclosure is completely redirected on write, and therefore will not be written into a bucket twice. All metadata is stored as key-value pairs. For example, a disk extent is a type of key, whose value is a list of pointers pointing to actual data; while an inode is indexed and stored by inode number, and its value is an inode structure. Each Dirent/xattr stores Dirent and Xattr using a key.

Key-Value Storage

Figure 3:
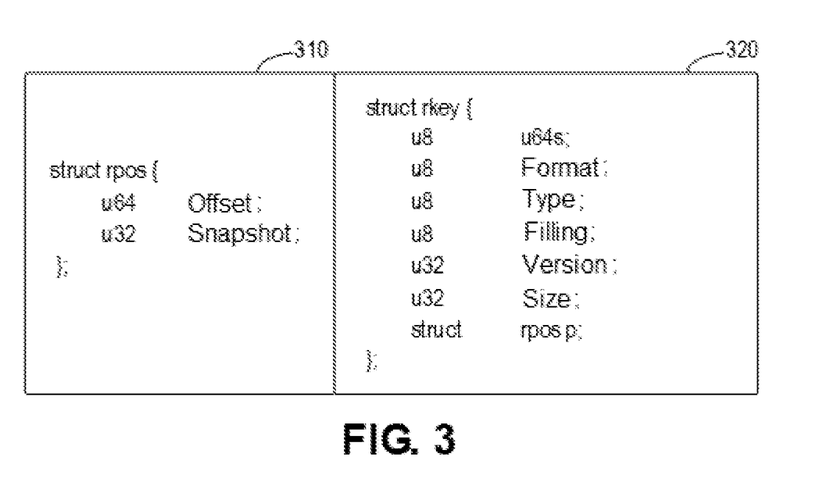
FIG. 3 shows a schematic diagram of an example structure of key-value storage according to an embodiment of the present disclosure.

FIG. 3 shows a schematic diagram of an example structure of key-value storage according to an embodiment of the present disclosure. As shown in FIG. 3, structure 310 is provided for a search key, and structure 320 is provided for an external container holding keys and values. As shown in structure 310, a high bit of the search key is an offset field, and a low bit is a snapshot field. Not all codes use all fields of the search key. Some codes use these fields in different ways. For a disk extent, the offset field corresponds to an offset within the file.

As shown in structure 320, a u64s field is of a size of combined key and value. It is generally not used directly, but may be used for a higher-level interface in units of u64s. A format field is internal to an implementation, and is used for packed rkeys. The rkeys are usually not stored in a B+ tree in a memory. A type field denotes a type of a value. For example, a directory entry code defines two different value types. A size field is used only by the disk extent, and all other keys are 0.

Values are stored inline with bkeys. Each value type has a structure definition, and then various accessor functions and wrapper types will be generated. When accessing a key stored in the B+ tree, it will unpack the key and return a wrapper type that contains pointers pointing to the unpacked key and the value. When an xattr code performs searching in the B+ tree, an iterator will return a key of type rkey_s_c, and then the xattr code will use rkey_s_c_to_xattr(k) to get the xattr itself.

ROW-Based B+ Tree Structure

Figure 4:
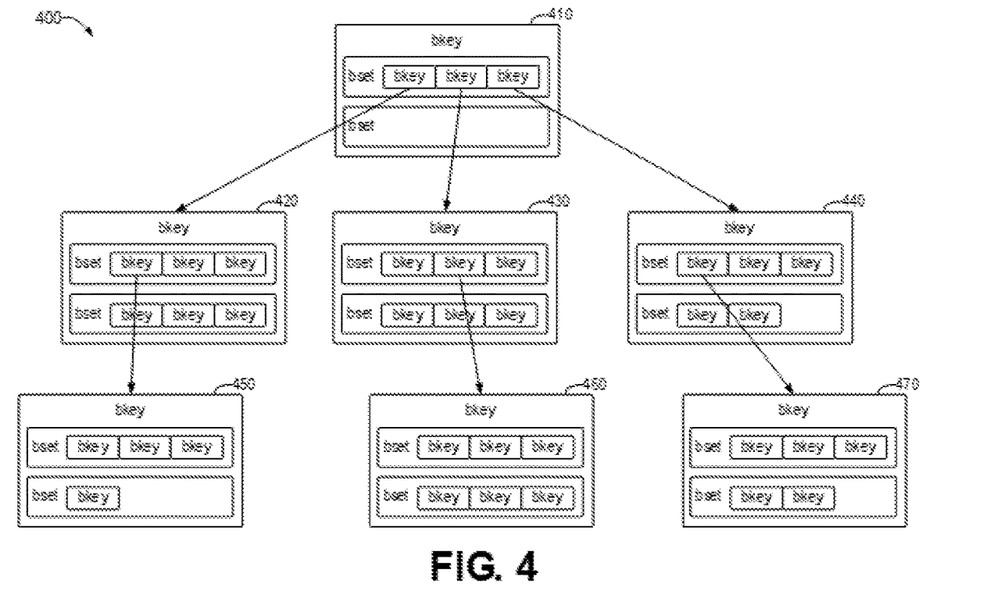
FIG. 4 shows a schematic diagram of an example B+ tree structure according to an embodiment of the present disclosure.

FIG. 4 shows a schematic structure diagram of example B+ tree 400 according to an embodiment of the present disclosure. As shown in FIG. 4, B+ tree 400 includes root node 410, intermediate child nodes 420, 430, 440, as well as leaf nodes 450, 460, and 470. Each node includes a plurality of rsets, and each rset further includes a plurality of rkeys. A B+ tree is a balanced binary tree, and is a balanced search tree designed for a solid state disk or other direct access auxiliary devices. In the B+ tree, all journal nodes are placed in leaf nodes of the same layer in an order of key values, and the leaf nodes are linked by pointers. Storing metadata using the B+ tree can improve the data search efficiency. A file system ensures the integrity of object metadata using a journal and the B+ tree.

In some embodiments, the B+ tree of the file system is a B+ tree based on redirect-on-write, where the tree nodes are usually very large, such as 512k, and adopt a journal structure. Updating a node may require recursively rewriting every node up to the root. However, most updates (for the leaf nodes and internal nodes) can be done with only additional operations in an implementation, until all the space originally reserved for the node has been written. A single B+ tree node journal entry is represented as a header and a list of bkeys, where the bkeys are sequentially contiguous in a memory.

Since the rkeys are of variable length, it's impossible to access keys randomly without other data structures, and only iteration can be sequentially performed via bkey_next( ). As shown in FIG. 4, a B+ tree node contains a plurality of independent bsets, all of which must be searched for and iterated during search. At any given time, one or more bsets will be written, and new keys will be inserted into a single dirty bset. As the B+ tree is modified, it is necessary to maintain an invariant in the memory, i.e., there are no duplicate keys, excluding keys marked as deleted. When an insertion overwrites an existing key, the existing key is marked as deleted. However, until the entire node is rewritten, old keys will still exist on the disk. To solve this problem, the first thing to do when reading the B+ tree node is to merge and sort all bsets contained therein, find duplicate keys in the merging and sorting, and delete older bkeys. When the B+ tree node is finally filled up and rewritten, it will be deleted.

After writing bset conversion, the bsets may also be sorted in the memory together with other bsets that have also been written. This operation can be performed periodically so that a given B+ tree node only has at most three bsets in storage. An inserted node is at most 8k or 16K, and the rest roughly forms a geometric progression, so that sorting the entire node is relatively infrequent. This resorting/compacting in the memory is one of the main methods capable of efficiently using such large B+ tree nodes. Another major technique is to take advantage of such a fact that the written bsets, in addition to use of recovery, also precompute lookup tables that would be too inefficient if they had to be modified for insertions. These lookup tables are referred to as auxiliary search trees, which will be further described below.

In the embodiment of the present disclosure, a storage allocation unit is bucket, and a space smaller than the bucket cannot be randomly allocated or released. According to an embodiment of the present disclosure, the B+ tree node is internally journal structured, and new keys may be attached to an existing B+ tree node without rewriting it, which means that each group of written keys has been sorted, but nodes are not sorted. In some embodiments, the journal structure may be stored in the memory, it is very expensive to hold 1 Mb key sort, and therefore it is necessary to distinguish between written keys and unwritten keys. Therefore, in order to search in the B+ tree node, it is necessary to search each sorted set. Therefore, the costs of these additional searches are very low, generally most keys in the B+ tree node are in a large set, and then there will be one or two much smaller sets.

B+ Tree Insertions

Index keys in a few B+ trees: a B+ tree is used for a disk extent, another B+ tree is used for an inode, still another B+ tree is used for dirent, and the like. A new B+ tree type may be added for a new function without changing a disk format. For example, for RAID 6, another B+ tree will be added into an index stripe by a physical device and LBA. In some embodiments, there are some important properties/invariants. Related to this, a delete operation is not disclosed as a primitive operation, but is done by inserting a key of type KEY_TYPE_DELETED. For example, a B+ tree code internally handles overwrites by setting an old key to KEY_TYPE_DELETED, which will then be deleted when a relevant B+ tree node is compacted. The deleted old key is never visible outside the B+ tree code. The order of insertions/updates is always maintained during abnormal shutdowns, and no refresh is needed.

This is important for file system codes. Creating a file or a new hardlink requires two operations: creating a new inode/increment inode refcount; and creating a new dirent. By performing these operations in a correct order, it may guarantee that after an abnormal shutdown, there will be no dirents pointing to nonexistent inodes, and inode references might be leaked, but garbage collection may be directly performed at runtime. In some embodiments, searches/insertions are done via a B+ tree iterator.

B+ Tree Updates

Insertions are usually done with a QLC-based B+ tree insertion function, which uses an iterator and insert an insertion into a current position of the iterator. This is often used in combination with a function that returns a key representing every valid position (synthesizing one of KEY_TYPE_DELETED if nothing was found). This is highly useful for the inode and dirent code. For example, to create a new inode, an inode code can search for an empty position and then use the QLC-based B+ tree insertion function when finding an empty position, and the B+ tree node's lock will guard against competition with other inode creations.

It might be impossible to perform the insertion without dropping locks, e.g., if a split is required. An insert flag indicates that an insert operation should not be performed in this case. The QLC-based B+ tree insertion function will return an interrupt, and a caller will loop and retry the operation. A disk extent code also uses a similar mechanism to implement a cmpxchg-like operation. This operation moves data in the back-end and the index update will succeed only in the case where an original key is present, to guard against competition with fore-end writes.

Optimization Locks

Unlike conventional read or write locks, locks used in embodiments of the present disclosure have three states: a shared lock (read lock), an intent lock, and an exclusive lock (write lock). The shared lock and a mutex lock correspond to read and write, while the intent lock is in the middle and conflicts with other intent locks, but they do not conflict with the read lock.

The problem solved by the intent lock is that with a conventional read/write lock, the read lock can't be upgraded to the write lock, which would lead to a deadlock when a plurality of threads with the read locks try to upgrade. With a complex enough data structure, updates will need to hold write locks to exclude other updates, much longer than the part where they perform the actual modification that needs to be excluded from reads. For example, considering the case of a B+ tree split, the update starts from a leaf node and discovers that a split must be performed. But before starting the split, it has to acquire a write lock on a father node, primarily to avoid a deadlock with other splits. It needs at least a read lock on the father node (roughly in order to lock a path to a child node), but then it couldn't upgrade that read lock to the write lock in order to update the father with a pointer to a new child, because that would deadlock with threads splitting sibling leaf nodes.

The intent lock can solve the above problems. When performing a split, it suffices to acquire an intent lock on the father node, and write locks will be held only when modifying B+ tree contents in the memory, which is much shorter than the entire split. Therefore, it is necessary to wait for new nodes to be written into the disk. For example, thread B is splitting the child node. It has allocated new nodes and written them out, and now needs to take a write lock on the father node, so as to add pointers to the new nodes. Thread A just wants to insert into the child node. It has a read lock on the father node and has searched the child node. Now, it's waiting on thread B to take an intent lock on the child node. But thread A has blocked thread B from taking its write lock in order to update the father node, and thread B can't drop its intent lock on the child node until after it is visible to the new nodes and has released the child node. The way of handling this deadlock is by enforcing. The read lock is dropped on the father node before taking the intent lock on the child node, which might cause the B+ tree node to be released before locking the B+ tree node. Therefore, check is performed after taking the intent lock, and traversal is redone, when necessary.

Further, B+ tree node locks have embedded sequence numbers, which are incremented when taking and releasing write locks. This allows to actively drop locks (because usually it is possible to retake the locks), and further use it for trying upgrade. If it is discovered that an intent lock is required (e.g., for a split, or because a caller inserts it into a leaf node without getting an intent lock), usually it is possible to get it without having to unwind and redo the traversal.

Auxiliary Search Trees

The code for performing searches, insertions, and other operations within a B+ tree node is relatively separated from the B+ tree code itself. The auxiliary search tree is a data structure for efficiently searching within a bset. There are two different data structures and search paths. For a currently inserted bset, a simple table is maintained in an array, where each entry per cache line of data in an original bset has one entry, which tracks an offset of a first key in the cache line. This is enough to perform a binary search and then a linear search when dropping down to a single cache line, and it's much cheaper to keep the latest state.

For constant bsets, a binary search tree is constructed in an array, where each node corresponds to one cache line of data in the original bset and the first key within the cache line. Therefore, traveling along the auxiliary search tree is roughly equivalent to performing a binary search on the original bset, but it has the advantage of a more friendly memory access mode, since at every iteration, children of a current node are adjacent in the memory. This means that unlike the binary search, it's possible to prefetch. Each node in the auxiliary search tree corresponds precisely to a cache line, and it is not necessary to store a full pointer pointing to the original key. If a position of a given node in the array/tree may be computed, then its index may be traversed sequentially, and it is only necessary to store an offset of the key within the cache line.

According to the embodiment of the present disclosure, when observing that it is performing the search and traveling along the tree, keys against which comparison is to be made are constrained to lie within a certain range [l, r). Then, l and r will be equal in high bits of some numbers, which may be 0. The keys against which comparison is to be made and a search key are equal in all the same bits, which means that it is not necessary to compare against, or store, any bits after that position. It is not necessary to store all low bits, either. It is necessary to store enough bits to correctly pivot on a key (referred to as m) pointed to by the current node; i.e., it is necessary to store enough bits (referred to as p) to distinguish between m and the key immediately prior to m.

Therefore, a node in the auxiliary search tree roughly needs to store bits from where 1 and r are initially different to where m and p are initially different, and usually there will not be very many bits. A full bkey has 160 bits, but 16 bits in the auxiliary search tree suffice to meet the requirements of most scenarios.

Since it is expected that sizes of these nodes are fixed, just one size is selected, and then whether it is impossible to construct a node is checked and flagged when constructing the auxiliary search tree. A search code will fall back to a position of comparing against the original key. If this rarely happens, then the impact on the performance may be negligible. The auxiliary search tree greatly improves the performance of a new file system when it is introduced. Among random searches with a large B+ tree, the auxiliary search tree is easily an order of magnitude faster.

Data Block Addressing

The file system of the embodiment of the present disclosure is disk extent-based, rather than block-based, and the disk extent is a variable-sized data block. Disk extents are indexed by offset, and their sizes are stored in a size field of the bkeys. The offset and the size are both in 512 byte sectors, so are the pointer offsets. An offset field denotes an end position of the disk extent within the file. A key with offset 8 and size 8 points to data for sectors 0 to 7. When iterating in an ascending order, this method may search for disk extents within a certain range. Inside the value is a list of one or more pointers. If there is more than one pointer, then they point to repeated data, or one of the copies is on a faster device and is considered cached.

Referring to FIG. 4, in order to maintain the index by the B+ tree, a B+ tree node contains 4 bsets. In each of the bsets, there are sorted bkeys. As simplified in FIG. 4, a B+ tree node shows only two bsets. Each B+ tree node is identified by a bkey, and the bkey is the maximum value among all bkeys in its child nodes.

Figure 5:
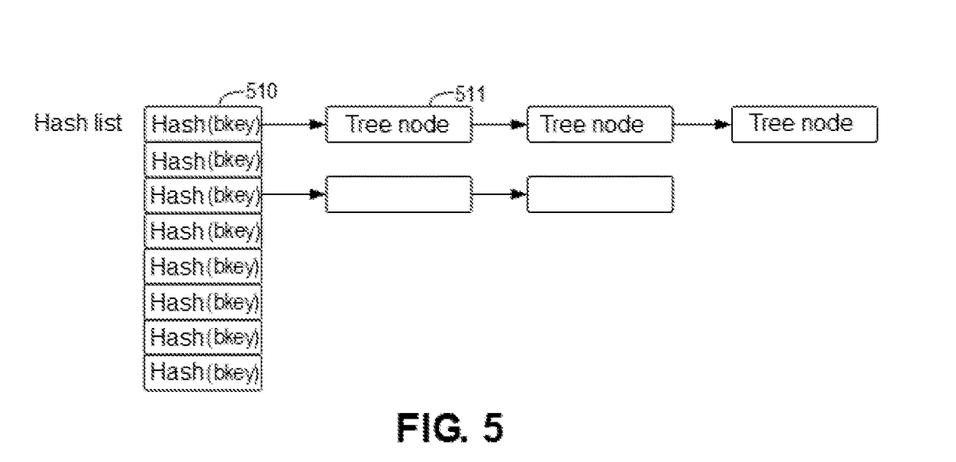
FIG. 5 shows a schematic diagram of a B+ tree structure in a memory according to an embodiment of the present disclosure.

Unlike a standard B+ tree, where a father node stores an address pointer of the child nodes, a bkey stored in a non-leaf node in the B+ tree of the embodiment of the present disclosure is used for searching its child nodes, rather than a stored address pointer. On the contrary, hash is computed based on the bkey, and then the B+ tree node is searched in a hash table. FIG. 5 shows a schematic diagram of a B+ tree structure in a memory according to an embodiment of the present disclosure. For example, for hash 510 of a bkey in a hash list, corresponding tree node 511 may be searched. Bkeys in leaf nodes store actual mapping. Cache data and positions on a disk can be found based on these keys.

Data Space Management

Figure 6:
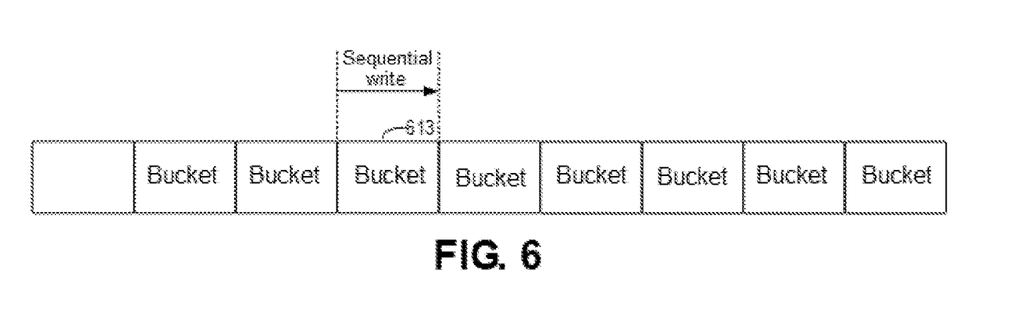
FIG. 6 shows a schematic diagram of storage space management according to an embodiment of the present disclosure.

FIG. 6 shows a schematic diagram of storage space management according to an embodiment of the present disclosure. As shown in FIG. 6, a device manager is divided into fixed-sized buckets, typically from 128k to 2M. The core of an allocator works in terms of buckets, and there is a sector allocator thereon. For example, for bucket 613, write of metadata is sequentially performed.

Space allocation in the buckets is allocated sequentially, only a current allocation offset is stored, and a next space allocation starts from a current offset, thereby converting random IO of all application layers to sequential writes. In addition, there are two priority rules for caching data: first, even if IO may come from different producers, the continuity of previous IO should still be ensured; second, by considering relevance, data from the same process is cached to the same bucket.

For example, steps of allocating the buckets are as follows: a. first checking whether there is an idle bucket in an idle list, and returning if there is an idle bucket in the idle list; b. if no buckets are available, then a current thread entering a wait state until a bucket is available; c. wakening an allocation thread; and d. updating bucket-related information, and if metadata is allocated to the buckets, then setting the buckets to be unreclaimable; otherwise, setting the buckets to be reclaimable.

For example, steps of allocating threads are as follows: a. if an allocated list is not empty, then acquiring buckets from the list; then adding the buckets to the idle list to ensure that the allocation function has available buckets, and wakening threads waiting for buckets; if the idle list is full, then blocking the allocation thread; b. if the list is empty, then invalidating a currently employed bucket; and c. updating relevant information stored on a disk.

When a bucket is allocated, it is written to once sequentially; and then, it will not be written to again until the entire bucket is reused. When a bucket is reused, its generation number will be incremented, and the new generation number will be retained before the bucket is discarded or written to again. If the bucket still contains any cached data, then incrementing the generation number is a mechanism that invalidates any live pointers pointing to that bucket.

Each bucket has a 16-bit priority and has an 8-bit generation number associated therewith. The generation numbers and priorities of all buckets are continuously stored and packed on the disk, and in a bucket link list, all the metadata except for a superblock is stored in the buckets. Priority is used for achieving LRU. When a bucket is allocated, its priority will be reset, and the priority of each bucket will be decreased at set intervals.

The allocation is done by buckets. Each bucket is associated with an 8-bit generation number. This generation number corresponds to a generation number in a B+ tree pointer. Only when they match is the pointer considered valid. Assuming that there is no dirty data or metadata in a bucket, the bucket can be reused simply by incrementing its generation number.

These generation numbers are written in any list of buckets on the disk, and there are pointers to them in a journal header. When a bucket becomes invalid, a variable newly generated by it must be written into a solid state disk, and it is used after waiting until the write is completed. Otherwise, after a crash, there may be a pointer that looks good but points to overwritten data.

The generation numbers are used for invalidating the buckets. Each pointer is also embedded in an 8-bit generator. In order to make a pointer to be considered valid, its generation number must match with a generation number of a bucket pointed to by the pointer. Therefore, in order to reuse the bucket, its generation amount needs to be incremented.

At startup, it is necessary to first traverse data blocks and a B+ tree to repopulate these counts before any allocation can be performed. If there is a lot of internal fragmentation, it is really necessary to copy garbage collection to compact data by rewriting it into new buckets. Since the generation number only includes 8 bits, it is necessary to guard against wraparound, which isn't a performance issue since wraparound requires rewriting the same bucket many times, and incoming write operations will be distributed across many buckets.

Sequential Consistency

The B+ tree provides the guarantee that an order of updates is always reserved. A journal helps here as well. The order is always reserved in the journal itself. If a key reaches the journal at time t and occurs after an abnormal shutdown/recovery, then all keys journaled prior to time t will be refreshed to the solid state disk either in the journal or in the B+ tree node.

The journal of the file system of the embodiment of the present disclosure is foremost an optimization of the B+ tree. The main purpose of the journal is to journal updates or insertions into the B+ tree, to avoid having to synchronize updates of the B+ tree on the solid state disk. The B+ tree does not require journals to maintain consistency of the solid state disk, but having a journal allows to coalesce random updates across a plurality of B+ tree nodes and refresh the nodes asynchronously.

The journal of the file system of the embodiment of the present disclosure is not required to maintain the consistency. Metadata write is always strictly ordered, such that the B+ tree and all other contents are maintained consistent on the solid state disk in the case of abnormal shutdown. This journal is for performance optimization. Prior to updating an index on the solid state disk, a write operation cannot be done. Otherwise, if a shutdown is abnormal, then the cache will be inconsistent. This means that if there is no journal, then under a random write workload, all leaf nodes in the B+ tree must be constantly updated, and these writes are almost all empty (at most a few keys are added to each write), but are extremely inefficient in respect of metadata write amount, which brings greater pressure to various B+ tree recovery/compaction codes. The journal is merely a journal of inserted keys. At startup, it is necessary to re-insert all the keys to open journal entries. This means that, when the B+ tree nodes are updated, they may be written out until waiting for a 4k key block to be filled up.

The journal is a logical journal, and is a list of insertions (bkeys) to reinsert on recovery in an order of their presences in the journal. Provided every index update is journaled, redoing these insertions is an idempotant operation. Keys appear in the journal in the same order as the order of insertions, so that both are done under write locks of the B+ tree nodes. Journal entries are variable-sized with fixed-length headers and then with entries having a variable number of structures.

The journal is written into a ring buffer of the bucket, which is retained in the superblock. The buckets are not necessarily contiguous on the solid state disk, which means not to allow journal entries to span across the buckets, and if necessary, the size of the journal may be adjusted at runtime. A journal bucket, an allocator, and all other buckets of garbage collection management are located in the same pool. The garbage collection marks the journal bucket as a metadata bucket.

A dirty journal entry is a journal entry including a B+ tree update that has not yet been written to the B+ tree on the solid state disk. It is not only necessary to track which journal entries are dirty, but also necessary to avoid surrounding journals, and overwrite an old and dirty journal entry with a new journal entry. To prevent overwriting the dirty journal entry on the solid state disk, a mapping may be kept for each journal storage area. The mapping is the highest sequence number of any journal entry contained thereby. Then, by comparing the highest sequence number with the last sequence number, whether the journal bucket contains a dirty journal entry can be determined.

In order to track which journal entries are dirty, a refcount may be maintained, where each entry corresponds to a particular sequence number. When the refcount becomes 0, the journal entry is no longer dirty. If a pending B+ tree write requires reference to a plurality of dirty journal entries, then it only retains the reference in the oldest journal.

The journal can be filled in two ways, one is that a write space is run out, the other is that there are too many open journal entries, and a refcount table has run out of a space. Since these refcounts are decremented without any lock, the FIFO size cannot be adjusted safely, and therefore it is treated in the same manner. If the journal is full, refreshing a new dirty B+ tree node will be started until a space can be re-allocated to write the journal, and a B+ tree node first fixing the oldest journal entries is preferably refreshed.

The B+ tree itself may not provide sorting. If updates happen to two different leaf nodes, the leaf nodes may be refreshed in any order. While a journal write will typically happen before the B+ tree node is refreshed, the B+ tree node will not be prevented from being refreshed right away, and certainly this is not expected, since refreshing the B+ tree node requires both to reclaim memory resources and to reclaim space in the journal. The most recent sequence number of all the journal entries into which the keys in this bset enter may be tracked.

Garbage Collection

The main purpose of garbage collection is to find a to-be-reused bucket. Garbage collection will also compute the amount of valid data currently contained in each bucket, such that when most of the bucket is overwritten, allocation can reuse the bucket more quickly. If an expired pointer contained in the B+ tree node exceeds a threshold, then it will rewrite the B+ tree node to prevent the bucket from generating a wraparound. If neighboring B+ tree nodes are empty enough, then they may be coalesced.

This will be triggered in either of the following two cases, one case is that an idle bucket is less than a threshold, and the other case is triggered by an invalid bucket. A function is to determine whether a use sector of a bucket pointed to by a key point is less than a specific threshold. If the use sector of the bucket pointed to by the key point is less than the specific threshold, garbage collection may be performed, otherwise, the bucket cannot be reclaimed. Garbage collection is typically triggered by an invalid garbage bucket. Garbage collection will scan the entire B+ tree and determine which bkeys may be objects for garbage collection. Then, the garbage collection reads data from the solid state disk via bkeys, and then writes the data into another bucket. After the write is done, the keys are removed from the list, and then added to the B+ tree.

A garbage collection strategy is coalescing B+ tree nodes with fewer keys to release the bucket, and moving a data bucket pointed to by a few leaf nodes to get more available buckets. The main process is as follows: coalescing B+ tree nodes containing a few keys to release buckets. Generation of buckets pointed to by the leaf nodes is less than generation of the keys, and the buckets can be reclaimed.

Data Read/Write Process

The core read path starts from a read function. For example, the algorithm is as follows: iterating over a disk extent B+ tree from a first sector in a request; and then checking a type of a returned key; if the type of the returned key is empty, then returning zero; if a disk extent is returned, then checking a pointer that can be read from; if they're all stale, then processing it like it is empty; if a relevant device is missing/not online, then returning an error; if normal, then having a pointer that can be read from; if the disk extent is smaller than the request, then splitting the request, and then sending the request to a sector of an appropriate device; and iterating until the entire request has been processed.

The write path is relatively complex because it's highly asynchronous, but the basic algorithm is as follows: setting a key that will represent to-be-written data; allocating some space to write to; adding the pointer to a space allocated to the previously set key; determining whether a required space can be allocated; if the required space cannot be allocated, then splitting both the key and the request; issuing a write operation to the just allocated space; looping until all the required space is allocated, then establishing a list of to-be-inserted keys; and finally, after data write is done, inserting the created key into the disk extent B+ tree, where the inserting process may involve a to-be-processed overlap case.

When a new write IO is received, data corresponding to the IO may have been partially cached. At this moment, a bkey created for the IO needs to handle this overlap problem. The B+ tree nodes are journal structured, and the B+ tree nodes on the solid state disk are likely to be overlapped, as they are written at different moments. However, the B+ tree nodes in a memory will not be overlapped, because if a bkey, when inserted, overlaps with a bkey in the memory, the overlap problem will be solved. In addition, merging and sorting of bkeys in the bset will be performed when reading the B+ tree nodes from the solid state disk, and the overlap problem will be checked and solved.

Figure 7A:
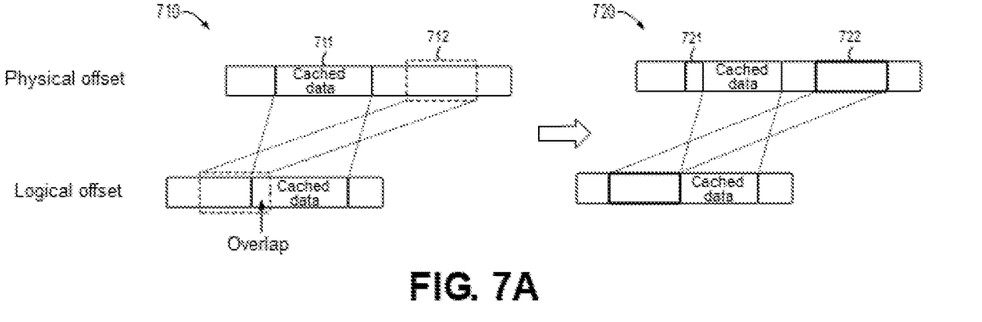
FIGS. 7A-7C show schematic diagrams of overlap when inserting a key into a B+ tree according to an embodiment of the present disclosure.

FIG. 7A shows an example overlapping data structure. As can be seen from a change from 710 to 720 in FIG. 7A, an original bkey is modified. For example, a logical offset of new IO 712 may be modified, and a size of cached data 711 may be modified, so that data 721 is invalid, and data 722 is newly allocated.

Figure 7B:
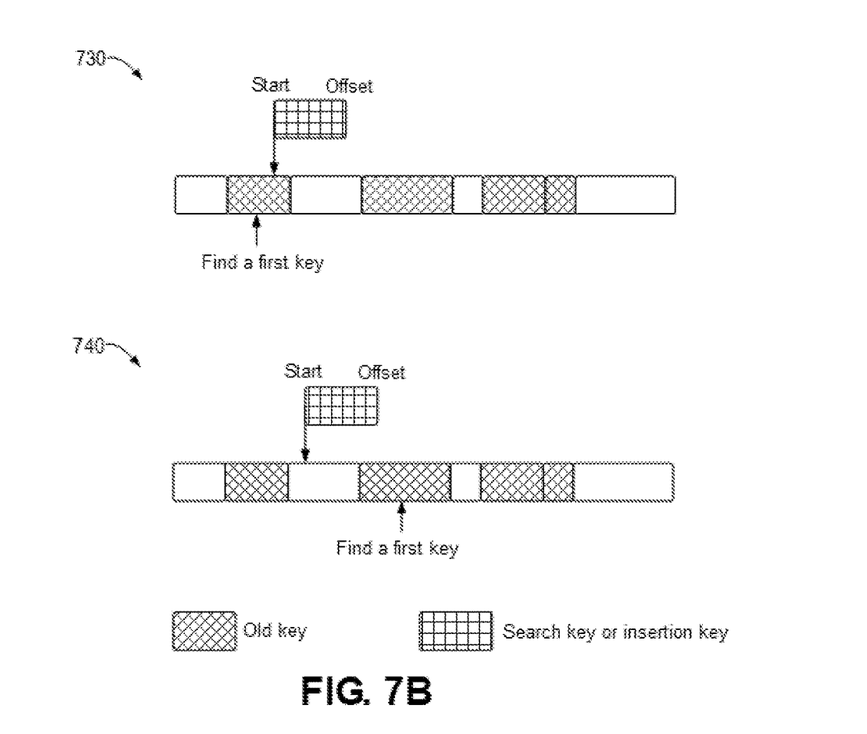
Figure 7C:
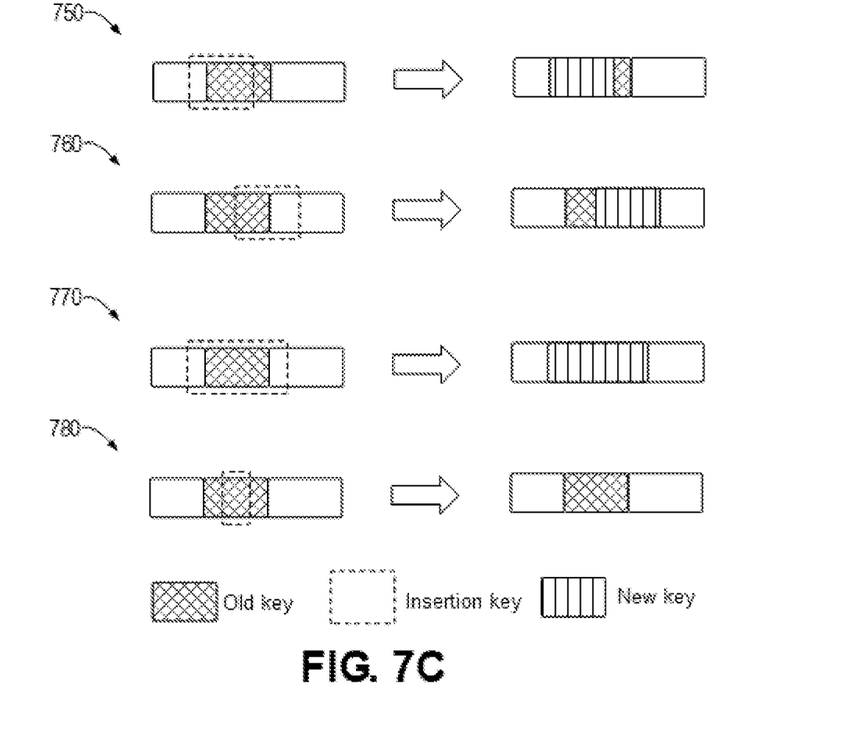

When inserting a key or searching for a key, the beginning of a to-be-processed key is used for traversing bkeys in a bset (bkeys in the bset have been sorted) to find a first key that may have an overlap. For example, FIG. 7B shows two cases 730 and 740. FIG. 7C shows four main to-be-processed overlap cases 750, 760, 770, and 780. When there is an overlap region, a key structure may need to be changed.

Compared with conventional methods, the embodiment of the present disclosure is a file system based on a variable disk extent and supports complete redirect-on-write, including redirect-on-write of data and metadata. Further, the embodiment of the present disclosure is completely sequential write for a high-density solid state disk, thereby improving the write performance and the life of the solid state disk. In addition, a space allocation algorithm based on bucket allocation is very adapted to a write model of the solid state disk, thereby reducing the write amplification and enhancing the system performance.

Further, in accordance with some embodiments of the present disclosure, a cost-effective index structure has avoided the recursive update problem. According to the embodiment of the present disclosure, tree nodes are set to be particularly large, typically 256K, and uses a journal structure, such that most updates (e.g., for the leaf nodes and internal nodes) can be done only with additional operations until the whole space has been written to, thereby effectively improving the write performance of the system. In addition, existing keys may be marked as deleted, but old keys will still exist on a disk until the entire node is rewritten. In addition, when reading a B+ tree node, it is necessary to merge and sort all bsets contained therein, find duplicate keys as a part of the merging and sorting, and delete old bkeys. The embodiment of the present disclosure can ensure the update sequence with reference to sorted B+ trees of a journal. Consistency of the solid state disk can be maintained without journals, but having a journal allows to coalesce random updates across a plurality of B+ tree nodes and refresh the nodes asynchronously.

Further, the auxiliary search tree of the embodiment of the present disclosure is used for efficient search within a bset disk extent, thereby greatly improving the read and write performance. For constant bsets, a binary search tree is constructed in an array, where each node corresponds to one cache line of data in an original bset. Therefore, traveling along the auxiliary search tree is equivalent to performing a binary search on the original bset, but it has the advantage of a more friendly memory access mode, since at every iteration, all children of a current node are adjacent in the memory. This means that unlike the binary search, it's possible to prefetch.

Figure 8:
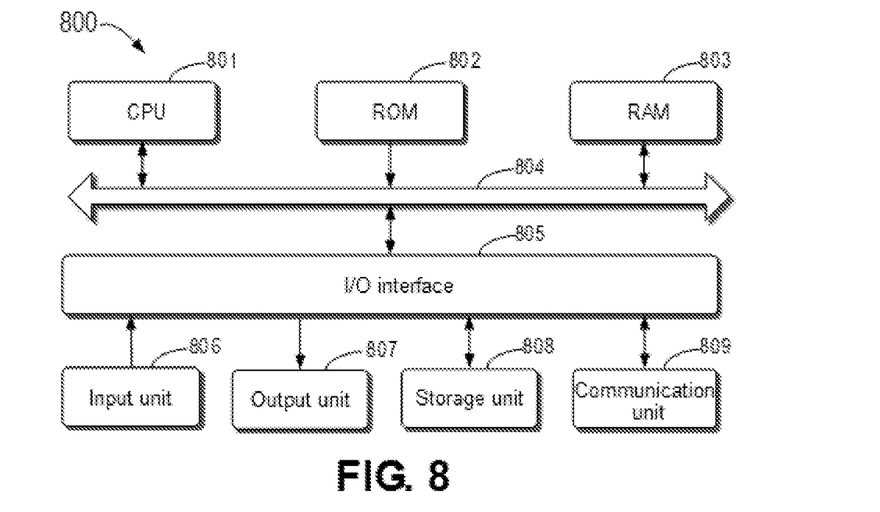
FIG. 8 shows a schematic block diagram of a device that may be configured to implement embodiments of the present disclosure.

FIG. 8 shows a schematic block diagram of device 800 that may be configured to implement embodiments of the present disclosure. Device 800 may be the device or apparatus described in the embodiments of the present disclosure. As shown in FIG. 8, device 800 includes central processing unit (CPU) 801, which may execute various appropriate actions and processing in accordance with computer program instructions stored in read-only memory (ROM) 802 or computer program instructions loaded onto random access memory (RAM) 803 from storage unit 808. RAM 803 may further store various programs and data required for operations of device 800. CPU 801, ROM 802, and RAM 803 are connected to each other through bus 804. Input/output (I/O) interface 805 is also connected to bus 804.

A plurality of components in device 800 are connected to I/O interface 805, including: input unit 806, such as a keyboard and a mouse; output unit 807, such as various types of displays and speakers; storage unit 808, such as a magnetic disk and an optical disk; and communication unit 809, such as a network card, a modem, and a wireless communication transceiver. Communication unit 809 allows device 800 to exchange information/data with other devices via a computer network such as the Internet and/or various telecommunication networks.

The methods or processes described above may be executed by processing unit 801. For example, in some embodiments, the method may be embodied as a computer software program that is tangibly included in a machine-readable medium, such as storage unit 808. In some embodiments, some of or all the computer program can be loaded into and/or installed onto device 800 via ROM 802 and/or communication unit 809. When the computer program is loaded into RAM 803 and executed by CPU 801, one or more steps or actions of the methods or processes described above may be executed.

In some embodiments, the methods and processes described above may be implemented as a computer program product. The computer program product may include a computer-readable storage medium with computer-readable program instructions for executing various aspects of the present disclosure loaded thereon.

The computer-readable storage medium may be a tangible device that can retain and store instructions used by an instruction-executing device. Examples of the computer-readable storage medium may include, but are not limited to, an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device, such as a punch card or an in-groove protruding structure with instructions stored thereon, and any suitable combination thereof. The computer-readable storage medium used here is not construed as transient signals per se, such as radio waves or other freely propagated electromagnetic waves, electromagnetic waves propagated through waveguides or other transmission media (e.g., optical pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from a network and forwards the computer-readable program instructions, such that the computer-readable program instructions are stored in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages, and conventional procedural programming languages. The computer-readable program instructions can be executed entirely on a user computer, executed partly on a user computer, executed as a separate software package, executed partly on a user computer and partly on a remote computer, or executed entirely on a remote computer or a server. In the case where a remote computer is involved, the remote computer can be connected to a user's computer through any kind of networks, including a local area network (LAN) or a wide area network (WAN), or can be connected to an external computer (e.g., connected through the Internet using an Internet service provider). In some embodiments, an electronic circuit, such as a programmable logic circuit, a field programmable gate array (FPGA), or a programmable logic array (PLA), is customized by utilizing state information of the computer-readable program instructions. The electronic circuit can execute the computer-readable program instructions to implement various aspects of the present disclosure.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture which includes instructions for implementing various aspects of the functions/actions specified in one or more blocks in the flowcharts and/or block diagrams.

The computer-readable program instructions may also be loaded onto a computer, another programmable data processing apparatus, or another device, such that a series of operation steps are performed on the computer, another programmable data processing apparatus, or another device to produce a computer-implemented process. Thus, the instructions executed on the computer, another programmable data processing apparatus, or another device implement the functions/actions specified in one or more blocks in the flowcharts and/or block diagrams.

The flowcharts and block diagrams in the accompanying drawings show the architectures, functions, and operations of possible implementations of the device, the method, and the computer program product according to a plurality of embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions denoted in the blocks may also occur in a sequence different from that shown in the figures. For example, two successive blocks may actually be executed substantially in parallel, or may sometimes be executed in a reverse sequence, depending on the functions involved. It should be further noted that each block in the block diagrams and/or flowcharts as well as a combination of blocks in the block diagrams and/or flowcharts may be implemented by a dedicated hardware-based system executing specified functions or actions, or by a combination of dedicated hardware and computer instructions.

The embodiments of the present disclosure have been described above. The above description is illustrative, rather than exhaustive, and is not limited to the disclosed various embodiments. Numerous modifications and alterations are apparent to those of ordinary skill in the art without departing from the scope and spirit of illustrated various embodiments. The selection of terms used herein is intended to best explain the principles and practical applications of the embodiments or the technological improvements to technologies on the market, or to enable other persons of ordinary skill in the art to understand the embodiments disclosed herein.

The invention claimed is:

1. A method for storage, comprising:
   receiving a write request for writing metadata of a file system into a solid state disk having a multi-level cell;
   caching the metadata of the file system into a memory; and
   sequentially writing the cached metadata into the solid state disk by redirect-on-write;
   wherein the storage system is provided with a variable-length disk extent, and the sequentially writing the cached metadata into the solid state disk by redirect-on-write comprises:
   storing first metadata in the file system using a first key-value pair, the first key-value pair comprising a disk extent identifier as a key and a pointer as a value; and
   storing second metadata in the file system using a second key-value pair, the second key-value pair comprising an inode number as a key and an index structure as a value.

2. The method according to claim 1, further comprising:
   for a second write request, caching metadata of the second write request into the memory; and
   sequentially writing, based on a determination that a size of the metadata of the second write request satisfies a predetermined size, the metadata of the second write request into a new location in the solid state disk.

3. The method according to claim 1, wherein the file system uses a tree structure as a metadata index, and the method further comprises:
   setting a size of a node in the tree structure as a predetermined threshold; and attaching a journal structure for storing a metadata update to the node.

4. The method according to claim 3, wherein the sequentially writing the cached metadata into the solid state disk by redirect-on-write comprises:
journaling, based on a determination that an amount of metadata updates for the node fails to satisfy the predetermined threshold, the metadata updates in the journal structure of the memory; and
writing, based on a determination that the amount of metadata updates for the node satisfies the predetermined threshold, metadata in the journal structure into the solid state disk.

5. The method according to claim 4, wherein the sequentially writing the cached metadata into the solid state disk by redirect-on-write further comprises:
sorting, based on a determination that the node is read, each group of keys in the node.

6. The method according to claim 5, further comprising:
constructing an auxiliary search tree for finding metadata, each node in the auxiliary search tree corresponding to a cache line.

7. The method according to claim 1, wherein the solid state disk is a solid state disk having a quad-level cell.

8. The method according to claim 1, further comprising:
receiving another write request for writing data of the file system, the metadata of the file system pertaining to the data of the file system, and
writing the data of the file system into the solid state disk by redirect-on-write to provide complete redirect-on-write of the data and the metadata of the file system.

9. An electronic device, comprising:
a processing unit; and
a memory coupled to the processing unit and storing instructions, wherein the instructions, when executed by the processing unit, execute the following actions:
receiving a write request for writing metadata of a file system into a solid state disk having a multi-level cell;
caching the metadata of the file system into a memory; and
sequentially writing the cached metadata into the solid state disk by redirect-on-write;
wherein the storage system is provided with a variable-length disk extent, and the sequentially writing the cached metadata into the solid state disk by redirect-on-write comprises:
storing first metadata in the file system using a first key-value pair, the first key-value pair comprising a disk extent identifier as a key and a pointer as a value; and
storing second metadata in the file system using a second key-value pair, the second key-value pair comprising an inode number as a key and an index structure as a value.

10. The device according to claim 9, further comprising:
for a second write request, caching metadata of the second write request into the memory; and
sequentially writing, based on a determination that a size of the metadata of the second write request satisfies a predetermined size, the metadata of the second write request into a new location in the solid state disk.

11. The device according to claim 9, wherein the file system uses a tree structure as a metadata index, and the actions further comprise:
setting a size of a node in the tree structure as a predetermined threshold; and
attaching a journal structure for storing a metadata update to the node.

12. The device according to claim 11, wherein the sequentially writing the cached metadata into the solid state disk by redirect-on-write comprises:
journaling, based on a determination that an amount of metadata updates for the node fails to satisfy the predetermined threshold, the metadata updates in the journal structure of the memory; and
writing, based on a determination that the amount of metadata updates for the node satisfies the predetermined threshold, metadata in the journal structure into the solid state disk.

13. The device according to claim 12, wherein the sequentially writing the cached metadata into the solid state disk by redirect-on-write further comprises:
sorting, based on a determination that the node is read, each group of keys in the node.

14. The device according to claim 13, wherein the actions further comprise:
constructing an auxiliary search tree for finding metadata, each node in the auxiliary search tree corresponding to a cache line.

15. The device according to claim 9, wherein the solid state disk is a solid state disk having a quad-level cell.

16. The device according to claim 9, wherein the actions further comprise:
receiving another write request for writing data of the file system, the metadata of the file system pertaining to the data of the file system, and
writing the data of the file system into the solid state disk by redirect-on-write to provide complete redirect-on-write of the data and the metadata of the file system.

17. A computer program product having a non-transitory computer readable medium which stores a set of instructions to perform storage; the set of instructions, when carried out by computerized circuitry, causing the computerized circuitry to perform a method of:
receiving a write request for writing metadata of a file system into a solid state disk having a multi-level cell;
caching the metadata of the file system into a memory; and
sequentially writing the cached metadata into the solid state disk by redirect-on-write;
wherein the storage system is provided with a variable-length disk extent, and the sequentially writing the cached metadata into the solid state disk by redirect-on-write comprises:
storing first metadata in the file system using a first key-value pair, the first key-value pair comprising a disk extent identifier as a key and a pointer as a value; and
storing second metadata in the file system using a second key-value pair, the second key-value pair comprising an inode number as a key and an index structure as a value.

18. The computer program product according to claim 17, wherein the method further comprises:
receiving another write request for writing data of the file system, the metadata of the file system pertaining to the data of the file system, and
writing the data of the file system into the solid state disk by redirect-on-write to provide complete redirect-on-write of the data and the metadata of the file system.

19. A method for storage, comprising:
receiving a write request for writing metadata of a file system into a solid state disk having a multi-level cell;

caching the to-be-written metadata of the file system into a memory; and sequentially writing the cached metadata into the solid state disk by redirect-on-write;

wherein the sequentially writing the cached metadata into the solid state disk by redirect-on-write comprises:

sequentially writing, based on a determination that a size of the metadata satisfies a predetermined size, the metadata of the predetermined size into a new location in the solid state disk.

20. The method according to claim 19, further comprising:

receiving another write request for writing data of the file system, the metadata of the file system pertaining to the data of the file system, and writing the data of the file system into the solid state disk by redirect-on-write to provide complete redirect-on-write of the data and the metadata of the file system.

\* \* \* \* \*